US011157961B2

(12) United States Patent
Greenberger et al.

(10) Patent No.: US 11,157,961 B2
(45) Date of Patent: Oct. 26, 2021

(54) AUGMENTING GRAPHICAL USER INTERFACES IN RESPONSE TO SOCIAL MEDIA INTERACTIONS

(71) Applicant: International Business Machines Corporation, Armonk, NY (US)

(72) Inventors: Jeremy A. Greenberger, San Jose, CA (US); Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 31 days.

(21) Appl. No.: 16/178,059

(22) Filed: Nov. 1, 2018

(65) Prior Publication Data

US 2020/0143425 A1    May 7, 2020

(51) Int. Cl.
*G06Q 30/02* (2012.01)
*G06F 9/451* (2018.01)
*G06T 11/60* (2006.01)
*G06F 3/0481* (2013.01)
*G06Q 50/00* (2012.01)

(52) U.S. Cl.
CPC ......... *G06Q 30/0267* (2013.01); *G06F 9/451* (2018.02); *G06T 11/60* (2013.01); *G06F 3/04817* (2013.01); *G06Q 50/01* (2013.01); *G06T 2200/24* (2013.01)

(58) Field of Classification Search
USPC ................................. 715/854, 14.1
See application file for complete search history.

(56) References Cited

U.S. PATENT DOCUMENTS

| | | | |
|---|---|---|---|
| 2013/0298084 A1* | 11/2013 | Spivack | G06Q 50/01 715/854 |
| 2016/0027045 A1 | 1/2016 | Kurian et al. | |
| 2016/0140619 A1 | 5/2016 | Soni et al. | |

* cited by examiner

*Primary Examiner* — Afaf Osman Bilal Ahmed
(74) *Attorney, Agent, or Firm* — Schmeiser, Olsen & Watts, LLP; Stephanie Carusillo

(57) ABSTRACT

A system and method for modifying contents of a graphical user interface of a user computing device in response to user interactions with the graphical user interface of the user computing device includes detecting an interaction on a social media channel by a user interfacing with the graphical user interface of the user computing device, analyzing a content of the interaction to determine a topic of the interaction with the post on the social media channel, determining that the topic of the interaction corresponds to one or more keywords associated with a digital promotion, which triggers a distribution of the digital promotion in response to the interaction with the graphical user interface, and augmenting the graphical user interface of the user computing device by displaying the digital promotion to the social media channel, thereby modifying the graphical user interface.

20 Claims, 15 Drawing Sheets

AUGMENTING GRAPHICAL USER INTERFACES IN RESPONSE TO SOCIAL MEDIA INTERACTIONS

TECHNICAL FIELD

The present invention relates to systems and methods for augmenting graphical user interfaces, and more specifically the embodiments of a digital promotion system for selectively modifying graphical user interfaces in response to user interactions with a graphical user interface of a user computing device.

BACKGROUND

Companies often seek opportunities to engage with their customers. Often times, companies will provide offers and promotions to entice users to make a purchase of a product or service being offered by the company. A common promotion or offer may be a static digital advertisement on a side of a webpage that was not prompted by a user action, other than visiting the webpage. The static digital promotions are often overlooked by the user.

SUMMARY

An embodiment of the present invention relates to a method, and associated computer system and computer program product, for generating a modified a graphical user interface of a user computing device. A processor of a computing system detects an interaction on a social media channel by a user interfacing with the graphical user interface of the user computing device, wherein a type of content of the interaction is determined in response to the detecting. A content of the interaction is analyzed to determine a topic of the interaction with the post on the social media channel. The topic of the interaction is determined to correspond to one or more keywords associated with a digital promotion, which triggers a distribution of the digital promotion in response to the interaction with the graphical user interface. The graphical user interface of the user computing device is augmented by displaying the digital promotion to the social media channel, thereby modifying the graphical user interface of the user computing device so that the graphical user interface of the user computing device displays the digital promotion in response to the interaction alongside the interaction.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
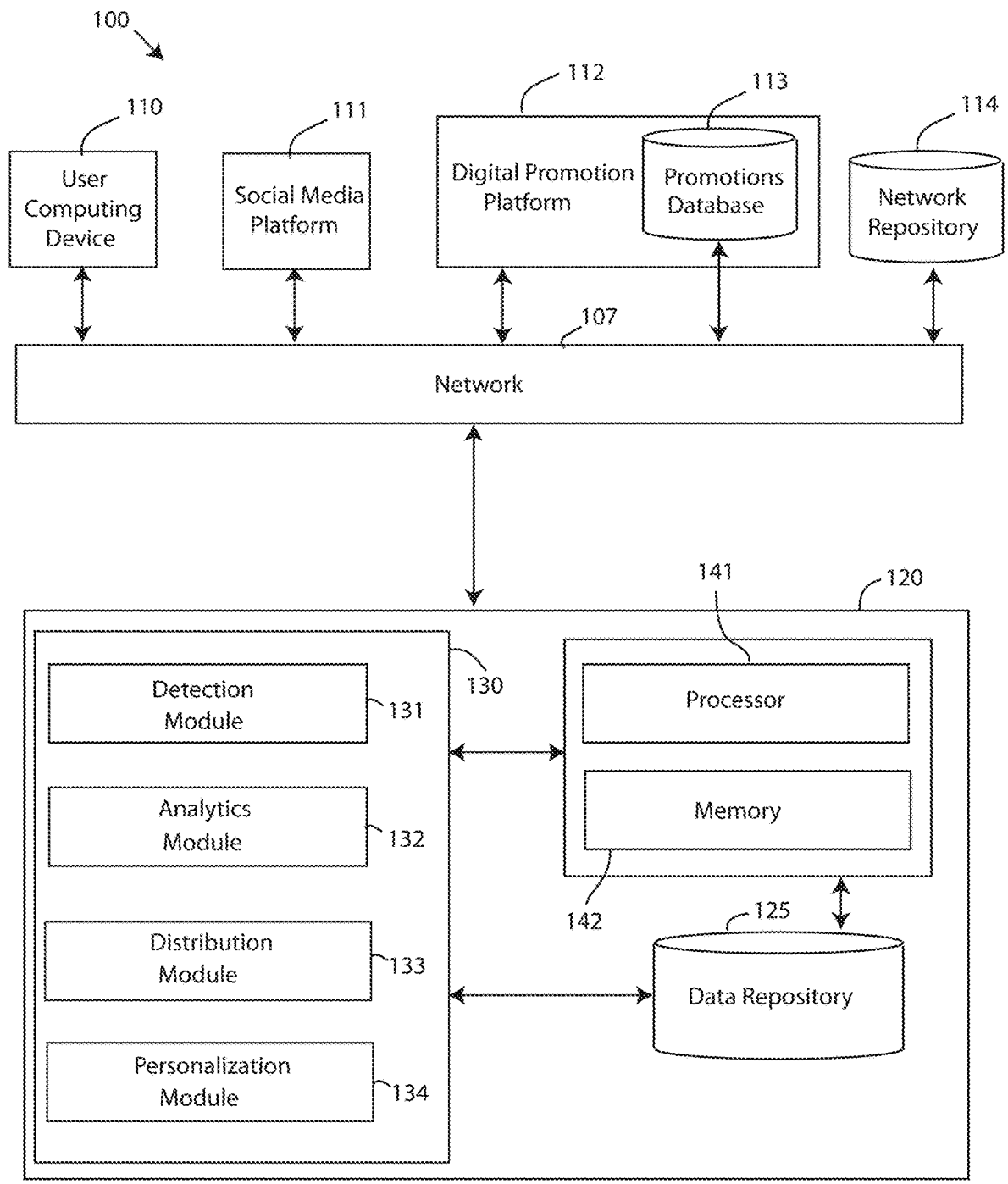
FIG. 1 depicts a block diagram of a digital promotion system, in accordance with embodiments of the present invention.

Referring to the drawings, FIG. 1 depicts a block diagram of a digital promotion system 100, in accordance with embodiments of the present invention. Embodiments of the digital promotion system 100 may be a system for selectively distributing digital promotions in response to user interactions with a graphical user interface of a user computing device. Embodiments of the digital promotion system 100 may be useful for rewarding users that interact on social media with relevant digital promotions that correspond to a topic of the interaction, which improves an efficiency of the distribution of the digital promotion. For example, the digital promotion system 100 may selectively distribute digital promotions to modify a graphical user interface (GUI) of a user's device in instances where a user is interacting on social media, and optionally include further personalization in the digital promotion. In other words, the digital promotion system 100 may perform GUI modification and/or augmentation to include a relevant digital promotion to reward a user's activity, thereby increasing a chance that the digital promotion is interacted with to avoid wasteful computer resources and processing power to deliver an ignored digital promotion. Examples of a digital promotion that can be selectively distributed to augment a GUI by the digital promotion system 100 may be an offer, an advertisement, a coupon code, a QR code, a promotion, a marketing material, and the like.

Embodiments of the digital system 100 may be a graphical user interface augmentation system, a product promotion system, a digital advertisement filtering system, a selective distribution system, a social media interaction engine, a graphical user interface modification system, and the like. Embodiments of the digital promotion system 100 may include a computing system 120. Embodiments of the computing system 120 may be a computer system, a computer, a server, one or more servers, a backend computing system, and the like.

Furthermore, embodiments of the digital promotion system 100 may include a user computing device 110, a social media platform 111, a digital promotion platform 112, and a promotions database 113, which are communicatively coupled to the computing system 120 over a network 107. For instance, information/data may be transmitted to and/or received from the user computing device 110, the social media platform 111, the digital promotion platform 112, and the promotions database 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) eg. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the user, product information, catalogs, digital promotional activity, user activity, user preferences, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging digital promotions, marketing offers, coupon codes, user social media activity, user social media profiles, and the like, to generate both historical and predictive reports regarding a particular user or a particular digital promotion, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the user computing device 110 may be a computing device, a computer, a desktop computer, a cell phone, a mobile computing device, a tablet computer, a laptop computer, a wearable computing device, a smartwatch, an augmented reality device, and the like, which may be used to interact with social media websites and individual posts on the social media platform 111. The user computing device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

Referring still to FIG. 1, embodiments of the digital promotion system 100 may include a social media platform system 111. Embodiments of the social media platform 111 may be communicatively coupled to the computing system 120 over network 107. Embodiments of the social media platform 111 may be a network, a computing system, a network of computers, a plurality of computers, databases, networks, one or more databases, storage devices, repositories, servers, computers, engines, and the like, that may service, run, store or otherwise contain information and/or data regarding a social media network of a user and the user's social contacts. The social media platform 111 may be accessed or may share a communication link over network 107, and may be managed and/or controlled by a third party, such as a social media company. In an exemplary embodiment, the social media platform 111 may be a social media network, social media website, social media engine, and the like, which may store or otherwise contain content supplied by a social contact of the user.

Embodiments of the digital promotion system 100 may also include a digital promotion platform 112 with a promotions database 113. Embodiments of the digital promotion platform 113 may be a network, a computing system, a network of computers, a plurality of computers, databases, networks, one or more databases, storage devices, repositories, servers, computers, engines, and the like, that may service, run, create, distribute, store or otherwise contain information and/or data regarding digital advertisements, digital promotions, The digital promotion platform 112 may be accessed or may share a communication link over network 107, and may be managed and/or controlled by a third party, such as a digital advertisement company. Moreover, the digital promotion platform 112 may have access to the promotions database 113. In other embodiments, the digital promotions database 113 may be directly accessible by the computing system 120. In yet another embodiment, the promotions database 113 is part of a data repository of the computing system 120. Embodiments of the promotions database 113 may be a database or other storage device that stores digital content, such as a digital promotion, offer, advertisement, and the like.

Furthermore, embodiments of the computing system 120 of the digital promotion system 100 may be equipped with a memory device 142 which may store various data/information/code, and a processor 141 for implementing the tasks associated with the digital promotion system 100. In some embodiments, a selective digital promotion application 130 may be loaded in the memory device 142 of the computing system 120. Embodiments of the selective digital promotion application 130 may be an interface, an application, a program, a module, or a combination of modules. In an exemplary embodiment, the selective digital promotion 130 may be a software application running on one or more back end servers, servicing one or more user computing devices 110, wherein a user interface portion of the software application (e.g. a social media platform software application) may also run on the user computing device 110.

The selective digital promotion application 130 of the computing system 120 may include a detection module 131, an analytics module 132, a distribution module 133, and a personalization module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Figure 2:
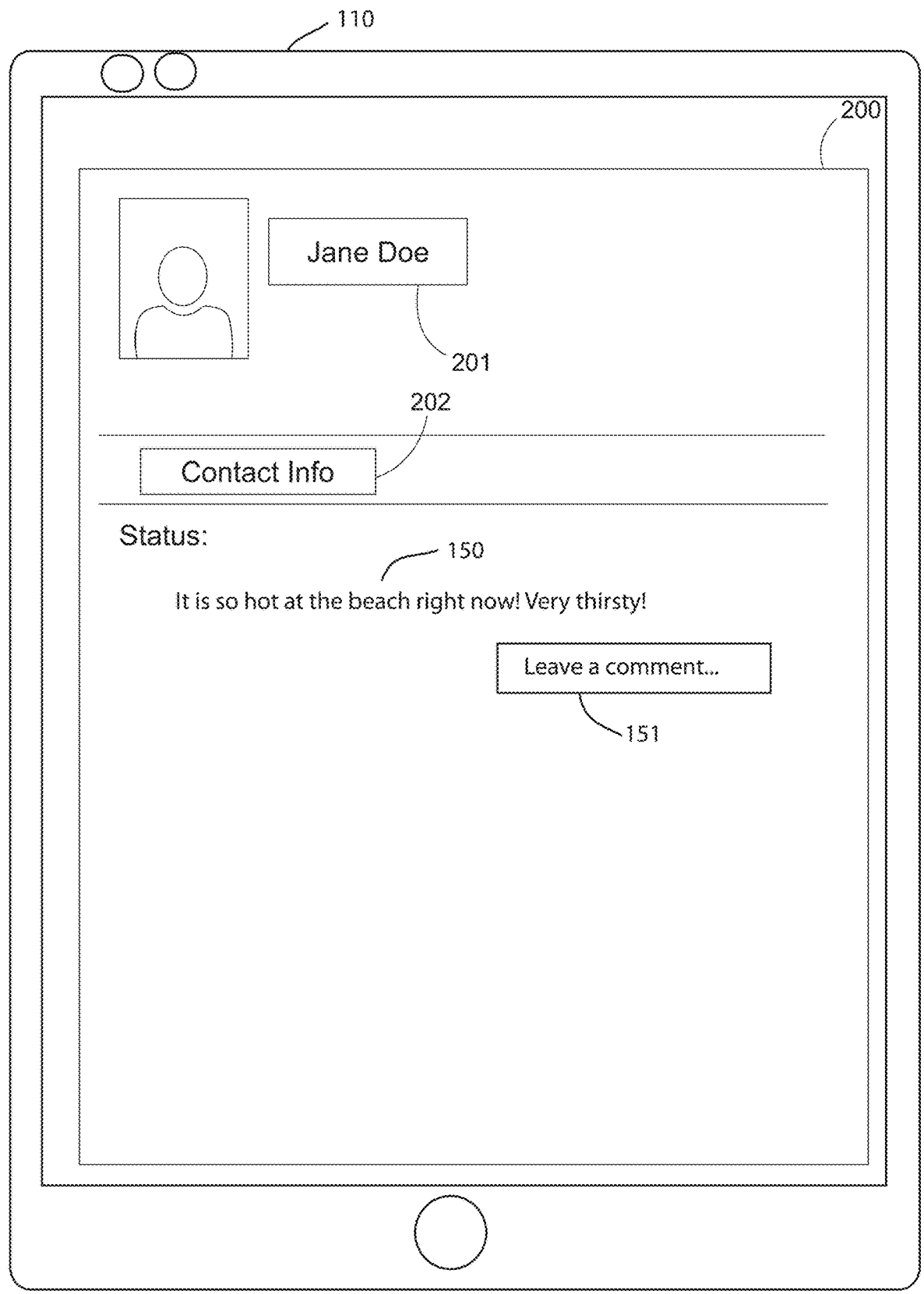
FIG. 2 depicts a graphical user interface of a user computing device showing a post on a social media platform, in accordance with embodiments of the present invention.

Embodiments of the detection module 131 include one or more components of hardware and/or software program code for detecting an interaction with a post on a social media website by a user interfacing with the graphical user interface of the user computing device. For instance, a person may post content on a social media website, wherein the post is a status update, a share, a like, a reply, a retweet, a comment, a tagging event, a photograph of a current activity, a video upload, and the like. The person's post is visible and accessible by the public, social media contacts, and the like, and can be interacted with. FIG. 2 depicts a graphical user interface 200 of a user computing device showing a post 150 on a social media platform 111, in accordance with embodiments of the present invention. The graphical user interface (GUI) 200 of the user computing device 110 may display a plurality of items, such as identifying information 201 of the person's social media website, a selectable contact option 202, and a post 150. In this example, a user has navigated to the person's social media website using a social media platform software application to view shared content on the person's social media website or 'page.' The GUI 200 displays the post 150 of the person, wherein the user of the user computing device 110 can interact, engage, interface, respond, etc. with the post 150. As noted above, the post 150 may be a status update, a share, a like, a reply, a retweet, a comment, a tagging event, a photograph of a current activity, a video upload, and the like. In FIG. 2, the post 150 is a text-based status update, "It is so hot at the beach right now! Very thirsty!." The GUI 200 provides a selectable icon/button 151 for directly interacting with the post 150.

By interfacing with the GUI 200, the user can interact with the post 150. The interaction by the user with the post 150 may be a reply, a comment, a tagging event, a photograph message, a like, a video reply, a retweet, and the like. Embodiments of the detection module 131 detects when the user interfaces with the GUI 200 and selects, touches, presses, clicks, etc. the selectable icon 151 to interact with the post 150. For example, a signal may be received by the computing system 120 from the social media platform 111 and/or the user computing device 110 indicating the user has interfaced with the GUI 200 to interact with the post 150 on a person's (e.g. Jane Doe 201) social media website. In other embodiments, the detection module 131 detects when the user begins interfacing with the GUI 200 to type, paste, upload, etc. content to the social media website at a particular location of the social media website.

Embodiments of the computing system 120 include an analytics module 132. Embodiments of the analytics module 132 include one or more components of hardware and/or software program code for analyzing a content of the interaction to determine a topic of the interaction with the post on the social media website. For instance, embodiments of the analytics module 132 analyzes, reviews, scans, parses, examines, etc. the content of the interaction of the user to the post 150 to determine a topic of the interaction. The topic of the interaction relates to at least one of: a brand of products, a type of product, a relationship between the brand and the user, a specific product, a specific store, a service, and the like. Moreover, embodiments of the analytics module 132 may first determine a type of content of the interaction to the post 150. For example, the analytics module 132 determines whether the content of the interaction is text, a photograph, a video, a location check-in, a digital file, and the like. The type of content determines which type of analyzation technique is used to determine the content of the interaction. If the type of content of the interaction is text, the analytics module 132 uses at least one a natural language processing technique, a sentiment analyzer, a topic analyzer, an insight engine, and the like. If the type of content of the interaction is a photograph or a video, the analytics module 132 uses an image recognition engine, a visual insights engine, and the like. If the type of content of the interaction is a location check-in, the geographic coordinates of the location check-in can be cross-referenced with known points of interest.

Figure 3:
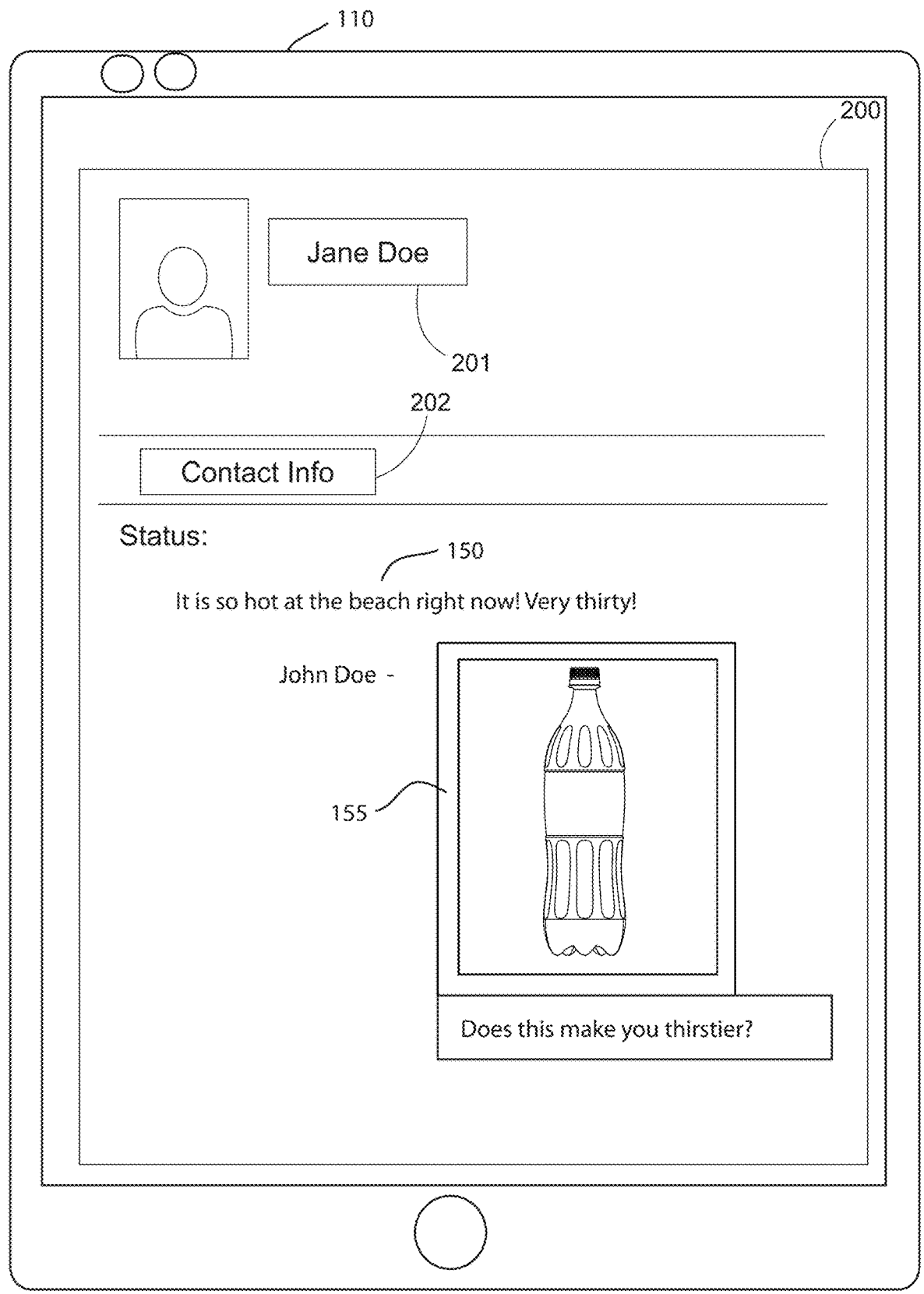
FIG. 3 depicts the graphical user interface of FIG. 2, wherein a user has interacted with the post on the social media platform, in accordance with embodiments of the present invention.

FIG. 3 depicts the graphical user interface 200 of FIG. 2, wherein a user has interacted with the post 150 on the social media platform 111, in accordance with embodiments of the present invention. In FIG. 3, the user has interfaced with the GUI 200 of the user computing device 110 to interact with the post 150 by posting a photograph accompanied by a text comment. The analytics module 132 determines that the type of content of the interaction 155 is a combination of a photograph and text. In particular, the user has posted a photograph of a beverage with a comment, "Does this make you thirstier?" The analytics module 132 employs a text analysis system that may parse, identify, etc. words using, for example, a natural language processing technique, to analyze the content (e.g. words) of the interaction 155. As a result of the text analysis, the analytics module 132 determines that the topic of the text portion of the interaction 155 relates to a person being thirsty, drinking, refreshments, needing something to drink, etc. The analytics module 132 further employs a visual recognition engine to analyze the photograph portion of the interaction 155. As a result of the visual recognition analysis, the analytics module 132 determines that the topic of the photographic portion of the interaction 155 relates to a bottle of liquid, refreshment, beverage, etc. The graphical user interface 200 of the user computing device 110 may be modified to display the interaction 155 alongside the post 150.

Further, as a result of the text analysis and image recognition engine techniques to determine the topic of the interaction 155, the analytics module 132 may extract one or more keywords that define or otherwise correspond to the topic of the interaction. For example, the analytics module 132 may analyze, parse, or otherwise process the results of the text analysis and the visual recognition engine to extract one or more keywords. In an exemplary embodiment, the analytics module 132 may extract "soda," "beverage," "thirsty," and "bottle" as plurality of keywords associated with the determined topic of the interaction 155.

Referring back to FIG. 1 embodiments of the computing system 120 includes a distribution module 133. Embodiments of distribution module 133 includes one or more components of hardware and/or software program code for determining that the topic of the interaction 155 corresponds to one or more keywords associated with a digital promotion, which triggers a distribution of the digital promotion in response to the interaction with the graphical user interface 200. For instance, embodiments of the distribution module 133 maps the keywords to a plurality of digital promotions stored in the promotions database 113, wherein each of the digital promotions stored in the promotions database 113 have one or more trigger keywords associated therewith. The distribution module 133 may interact with a digital promotion platform 112 to facilitate that the mapping of the keywords to the trigger keywords of the digital promotions stored in the digital promotions database 113, or may interact directly with the promotions database 113 over network 107. In an alternative embodiment, the promotions database 113 may be located directly on the computing system 120 so that the computing system 120 can directly access the digital promotions.

The digital promotions can be digital advertisements, marketing offers, offers, coupons, promotions, sale promotions, and the like, which have one or more trigger keywords buried, embedded, programmed, etc. in the metadata of the digital promotion. If the one or more keywords extracted from the topic of the interaction 155 matches, corresponds to, relates to, or is otherwise relevant to the trigger keywords buried in a digital promotion, then the distribution module 133 selects, retrieves, acquires, or otherwise obtains the digital promotion from the promotion database 113. In an exemplary embodiment, the digital promotion is automatically sent to the computing system from the digital promotion platform 112 in response to receiving a signal from the computing system with the one or more keywords extracted from the interaction 155. Accordingly, the distribution module 133 maps the one or more keywords to the promotions stored in the promotion database 113, and if the one or more keywords match trigger keywords of a particular digital promotion, a distribution of the digital promotion to augment the GUI 200 of the user computing device 110 is automatically triggered. The selective distribution of the digital promotions based on a match between the topic of the interaction and the trigger keywords associated with the digital promotion increases an efficiency of the digital promotion because the topic of the digital promotion is relevant to the user's interaction 155 to the post 150, as well as rewards the user for interacting on the social media platform 111. Distributing the topic-relevant digital promotion in response to the user interfacing with the GUI 200 to interact with the post 150 also adds a layer of personalization to the digital promotion, thereby increasing the efficiency of the digital promotion platform 112 and/or computing system 120 by saving the processing power and computer resources needed to distribute an irrelevant digital promotion, and increasing a chance that the user will engage with the digital promotion.

Further, the distribution module 133 may apply machine learning algorithms to improve the efficiency and/or success rate of the digital promotions over time. For instance, the digital promotion initially selected for distribution to augment the GUI of the user computing device can be modified based on previous responses by the user to similar digital promotions. The distribution module 133 may use a machine learning algorithm that tracks user activity and engagement with the digital promotion for each type of digital promotion to learn tendencies of the user interacting with the post 150. If the previous responses to digital promotions indicate that a user is more likely to engage with a digital promotion that offers a percentage discount rather than a digital promotion that offers a buy one-get one, the distribution module 133 can discard the initially selected digital promotion and distribute a replacement digital promotion, but one that offers a percentage discount since the user is more likely to engage.

Likewise, if previous user activity indicates that a user is less likely to engage with a digital promotion that provides a discount on a food item but is more likely to engage with a digital promotion that provides a discount on a sporting event, the distribution module 133 can discard the initially selected digital promotion and distribute a digital promotion for a sporting event that is known to serve the food item contained in the initially selected digital promotion, since the user is more likely to engage.

If the previous responses indicate that a user is more likely to engage with a digital promotion that offers a percentage discount that exceeds a threshold amount (e.g. 25%), the distribution module 133 can discard the initially selected digital promotion and distribute a digital promotion that still correlates to the topic of the user's interaction, but for a different item/good that offers a percentage discount that exceeds the threshold amount, since the user is more likely to engage.

Moreover, instead of discarding the initially selected digital promotion and selecting a new one from the promotions database 113, the distribution module 133 may modify or augment the initially selected promotion to adjust for the user's tendencies and previous engagement statistics tracked by machine learning technologies. For example, if the system has learned over time that the user reacts more positively to offers that appear urgent (e.g. 25% off for the next six hours), the distribution module 133 can modify the initially selected digital promotion to be appended with a window of time before the digital promotion expires. The GUI of each user can thus be augmented uniquely based on the user's own tendencies in interacting with the selected digital promotions. By way of example, two different users can interact with post 150 in a similar manner, yet receive very different digital promotions based on each user's tendencies learned over time by the distribution module 133 applying machine learning techniques.

Further, the distribution module 133 can select an initial plurality of digital promotions from the promotions database 113, and then, based on the data from the machine learning algorithms, apply a filter to filter out less likely to succeed digital promotions and select an optimal digital promotion to send to the user.

Accordingly, the distribution module 133 can utilize machine learning to improve the selection of the digital promotions to be distributed to the user. The keyword mapping/decision tree etc. described above that is used to select the digital promotions can be modified each time based on machine learning data gathered over time to predict an engagement success of a digital promotion. As a result, the distribution module 133 makes smarter and more tailored selections based on the improved mapping over time, and the computing system 120 makes smarter modifications to the GUI of the user computing device over time.

With continued reference to FIG. 1, embodiments of the distribution module 133 includes one or more components of hardware and/or software program code for augmenting the graphical user interface 200 of the user computing device 110 by appending the digital promotion to the social media website, thereby modifying the graphical user interface 200 of the user computing device 110 so that the graphical user interface 200 of the user computing device displays the digital promotion in response to the interaction 155 alongside the post 150. For instance, when the digital promotion is selected for distribution based on the trigger keywords of embedded into the digital promotion stored in the promotion database 113, a graphical user interface 200 of the user computing device 110 superimposes, adds, inserts, displays, etc. the digital promotion on the social media website, such that the website and the GUI 200 is altered to display the digital promotion over the original GUI 200 layout. The distribution module 133 modifies, re-renders, adjusts, alters, changes, affects, etc. the website so that the GUI 200 is augmented to display the topic relevant digital promotion. In an exemplary embodiment, the distribution module 133 superimposes the digital promotion on the website such that only the user's GUI 200 is altered to display the digital promotion, and any other person accessing the same webpage to view the post 150 and interaction cannot see the digital promotion.

Figure 4:
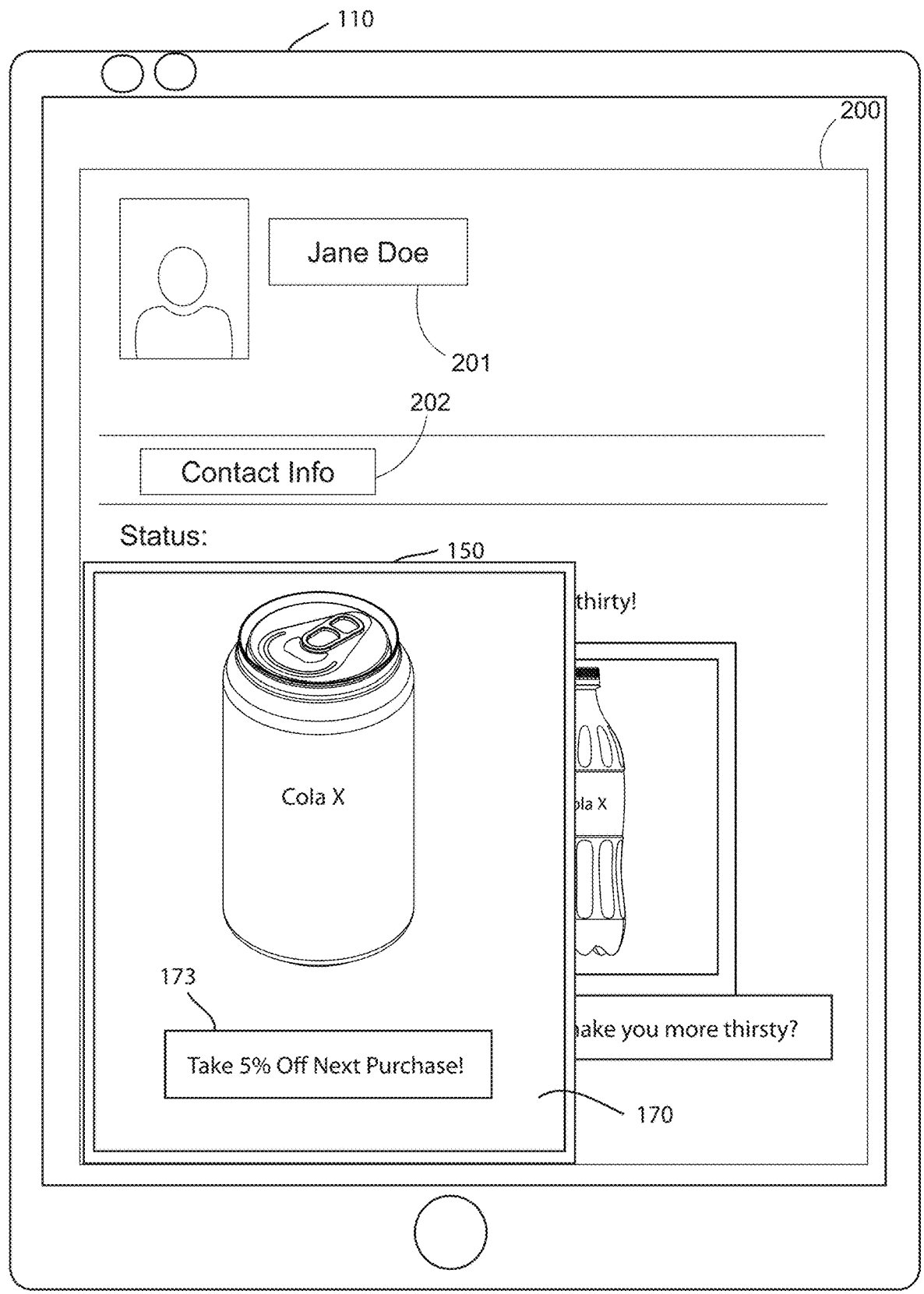
FIG. 4 depicts the graphical user interface of FIG. 3, wherein the graphical user interface has been altered by a superimposed topic-relevant digital promotion, in accordance with embodiments of the present invention.

FIG. 4 depicts the graphical user interface 200 of FIG. 3, wherein the graphical user interface 200 has been altered by a superimposed topic-relevant digital promotion 170, in accordance with embodiments of the present invention. The topic-relevant digital promotion 170 is shown superimposed on the website, thereby augmenting the GUI 200. The digital promotion 170 displayed on the website is related to the topic of "soda," "beverage," "thirsty," and "bottle" determined by the computing system. In particular, the keywords "soda" and "thirsty" were buried or otherwise included in the metadata of the digital promotion 170, and in response to the computing system 120 extracting that the keywords "soda," "beverage," "thirsty," and "bottle" and mapping the keywords "soda," "beverage," "thirsty," and "bottle" to the digital promotions database 113, the digital promotion 170 was triggered for distribution by the distribution module 133 of the computing system 120. The digital promotion 170 includes a photograph of a branded soda can (e.g. Cola X) with a text-based offer of "Take 5% Off Next Purchase!". The GUI 200 is further augmented to include a selectable icon 173 that, when selected by the user, indicates that the user has an interest in the digital promotion. Without augmenting the GUI 200 with the digital promotion 170, the GUI 200 would remain unchanged after the interaction 155, and the user would not have the opportunity to engage the digital promotion 170. Accordingly, a topic-relevant digital promotion 170 may be superimposed onto the social media website alongside the post 150 only on the user computing device 110 so that not only is the digital promotion customized to the user's interaction 155, but also exclusively presented to the user such that the social media website is altered only on the GUI 200 of the user computing device 110.

Moreover, the graphical user interface 200 may be augmented with the digital promotion within a predetermined amount of time measured from the interaction 155. For example, the distribution module 133 may immediately alter the GUI 200 to include the digital promotion, or may alter the GUI 200 after a predetermined amount of time, once the interaction 155 is posted to the website. Alternatively, the graphical user interface 200 is augmented with the digital promotion within a predetermined amount of time measured from an inactivity period of the user interfacing with the graphical user interface. For instance, the distribution module 133 may measure a period of time between the publishing of the interaction 155 or a period of inactivity of the user to draw the user back onto the social media platform 111 (e.g. a push notification sent 5 minutes after the user closes the software application.

Referring back to FIG. 1, embodiments of the computer system 120 includes a personalization module 134. Embodiments of the personalization module 134 includes one or more components of hardware and/or software program code for further personalizing the digital promotion to the user, based on a shared social media content across the social media platform 111 that is relevant to the topic of the digital promotion. For instance, the personalization module 134 may review, analyze, parse, examine, etc. a shared content of the user across the social media platform 111 to determine whether the shared content is relevant to the topic of the digital promotion. For instance, embodiments of the personalization module 134 may analyze a user's social media network via content shared by the user or shared by social contacts in the user' social media network about the user on the social network platform 111. The personalization module 134 may ascertain a context of the shared content, and then determine whether the context of the shared content correlates to the topic of the digital promotion selected for distribution. The shared content shared, uploaded, or otherwise posted on the social media platform 111 may be photographs, videos, comments made on other contacts' pages, text-based posts made to the social contact's own social media page, and the like. The shared content may be analyzed, parsed, scanned, searched, inspected, etc. for a context that correlates or otherwise relates to or is associated with the topic of the digital promotion. In an exemplary embodiment, the personalization module 134 may utilize a natural language technique to determine keywords associated with the content available on the social media platform 111, and then examine the determined keywords with keywords that may be relatable with the topic or a product, location, service, service provider, etc. captured or otherwise encompassed by the topic. In another exemplary embodiment, the personalization module 134 may utilize an image or visual recognition engine to inspect, parse, scan, analyze, etc. a photograph, image, video, or other content to determine one or more descriptions or insights that describe or are associated with the photograph, image, video, or other content, and then examine the descriptions/insights with keywords that may be relatable with the topic or a product, location, service, service provider, etc. captured or otherwise encompassed by the topic. In yet another embodiment, the personalization module 134 may use a combination of natural language techniques, cognitive applications/engines, and visual recognition engines to determine a context of the shared content available on the social media platform 111.

Moreover, embodiments of the personalization module 134 compare the determined context from the shared content with the topic and/or trigger keywords of the digital promotion. For instance, keywords, texts, insights, or other acquired computer readable information associated with the analyzed shared content may be compared with keywords, texts, insights, or other computer readable information associated with the topic. Based on the comparison, the personalization module 134 determines that the context of a particular social media content correlates or is relevant to the topic of the digital promotion. In response to determining that a user's social media shared content is relevant to the topic of the digital promotion, the personalization module 134 may further tailor the digital promotion. In an exemplary embodiment, more than one potential topic-relevant digital promotion contains the trigger keywords that match the keywords of the topic of the user's interaction to the post on the social media website. The personalization module 134 then filters the potential topic-relevant digital promotions that more closely relate to the user, and selects the more closely related digital promotion for distribution. Additionally, a personalized message can be appended to the selected digital promotion that is based on the shared user social media content.

Figure 5:
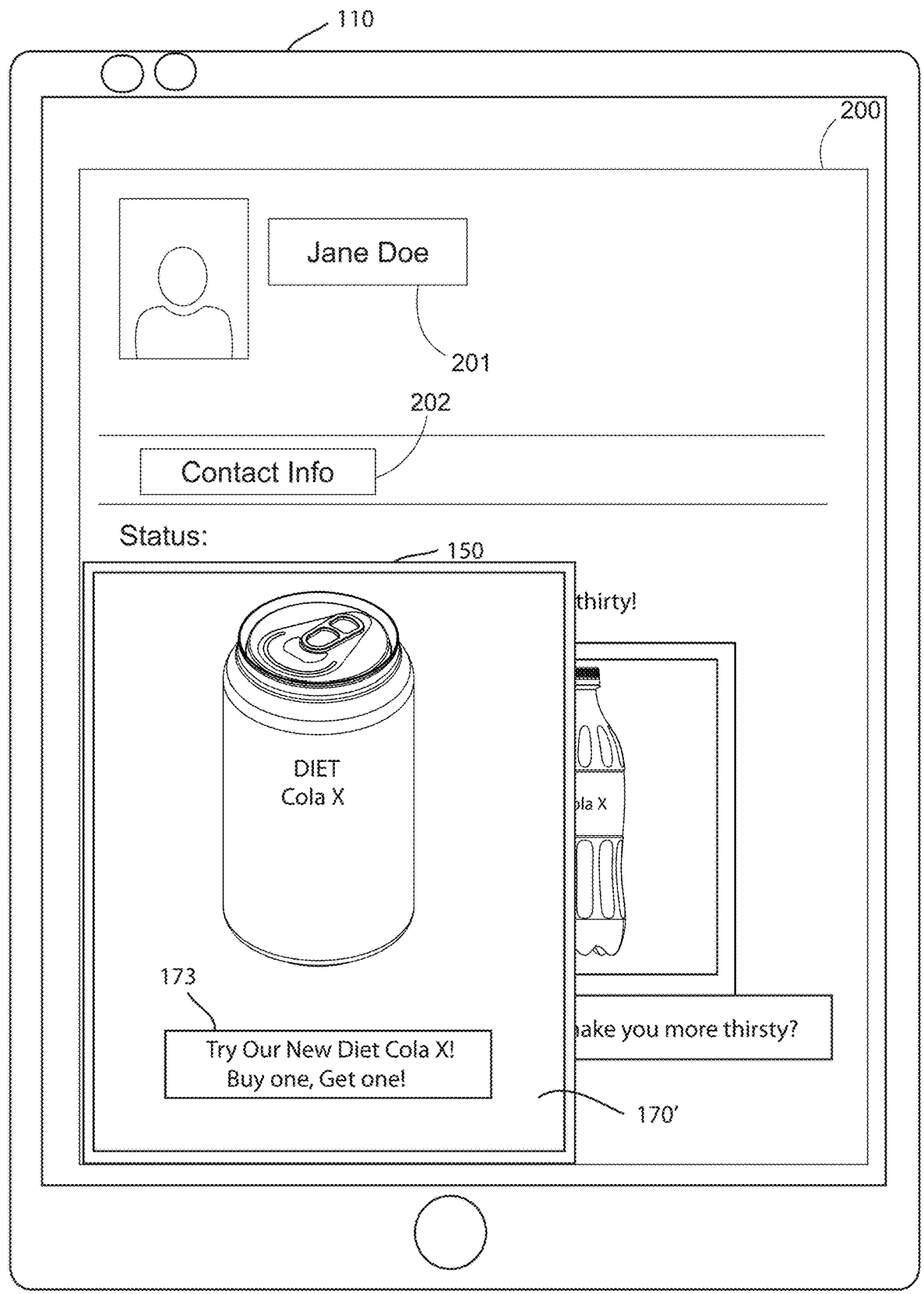
FIG. 5 depicts the graphical user interface of FIG. 3, wherein the graphical user interface has been altered by a superimposed topic-relevant and further personalized digital promotion 170', in accordance with embodiments of the present invention.

FIG. 5 depicts the graphical user interface 200 of FIG. 3, wherein the graphical user interface 200 has been altered by a superimposed topic-relevant and further personalized digital promotion 170', in accordance with embodiments of the present invention. The topic-relevant digital promotion 170' is shown superimposed on the website, thereby augmenting the GUI 200. The digital promotion 170' displayed on the website is related to the topic of "soda," "beverage," "thirsty," and "bottle" determined by the computing system. In particular, the keywords "soda" and "thirsty" were buried or otherwise included in the metadata of the digital promotion 170', and in response to the computing system 120 extracting that the keywords "soda," "beverage," "thirsty," and "bottle" and mapping the keywords "soda," "beverage," "thirsty," and "bottle" to the digital promotions database 113, the digital promotion 170' was triggered for distribution by the distribution module 133 of the computing system 120, similar to the digital promotion 170 described above. However, the personalization module 134 has determined that the user is recently been dieting based on a number of posts on the user's social media website. Based on the posts by the user about dieting, the digital promotion 170' is further personalized, taking into account the user's posts about dieting. In FIG. 5, the digital promotion 170' includes a photograph of a branded soda can for a diet version of the soda (e.g. DIET Cola X) with a text-based offer of "Try Our New Diet Cola X! Buy one, Get one!". The GUI 200 is further augmented to include a selectable icon 173 that, when selected by the user, indicates that the user has an interest in the digital promotion. Without augmenting the GUI 200 with the digital promotion 170', the GUI 200 would remain unchanged after the interaction 155, and the user would not have the opportunity to engage the digital promotion 170'. Accordingly, a topic-relevant and further personalized digital promotion 170' may be superimposed onto the social media website alongside the post 150 only on the user computing device 110 so that not only is the digital promotion customized to the user's interaction 155 and personalized to the user's social media activity, but also exclusively presented to the user such that the social media website is altered only on the GUI 200 of the user computing device 110.

Figure 6:
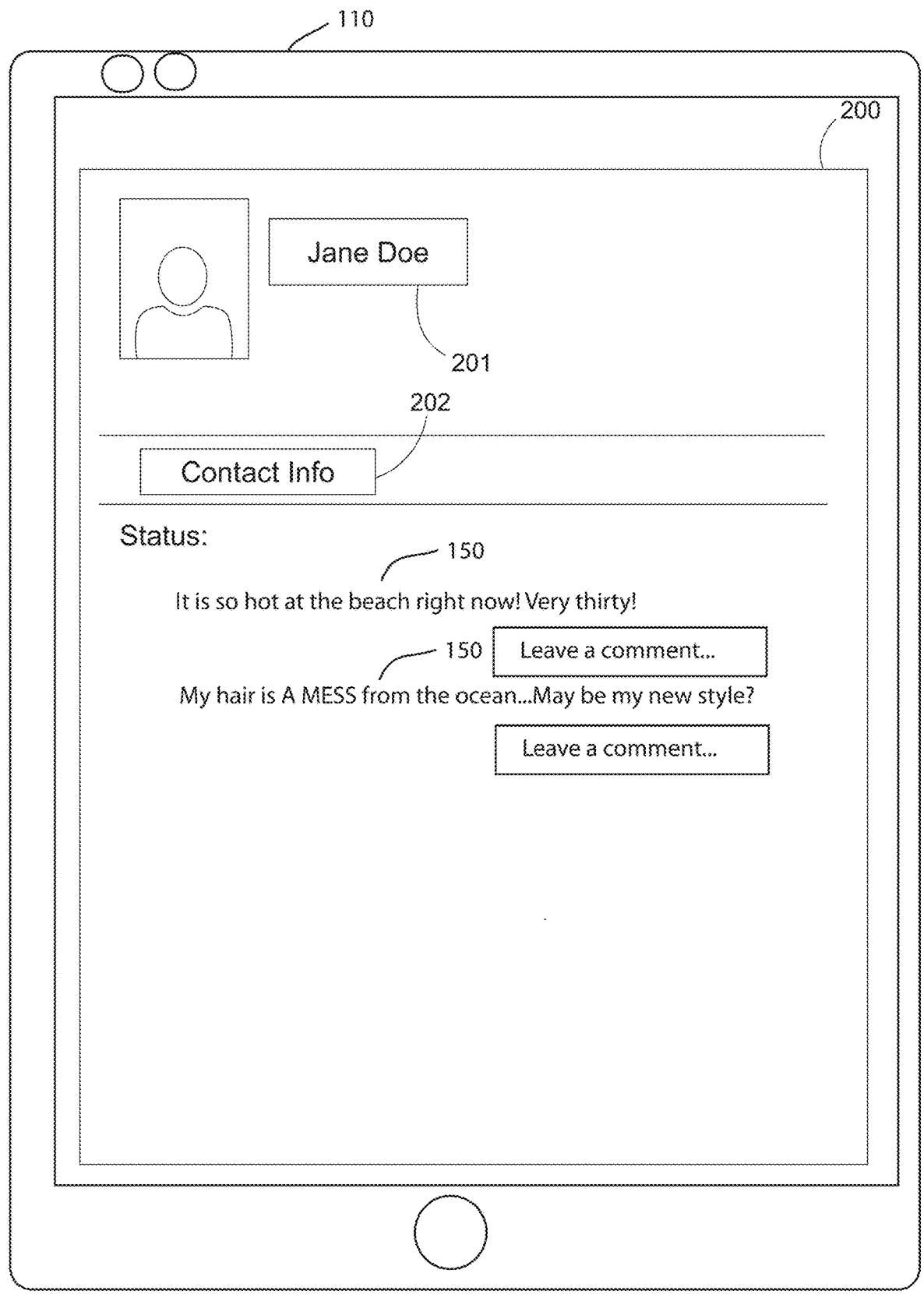
FIG. 6 depicts another embodiment of a graphical user interface of a user computing device showing a post on a social media platform, in accordance with embodiments of the present invention.
Figure 7:
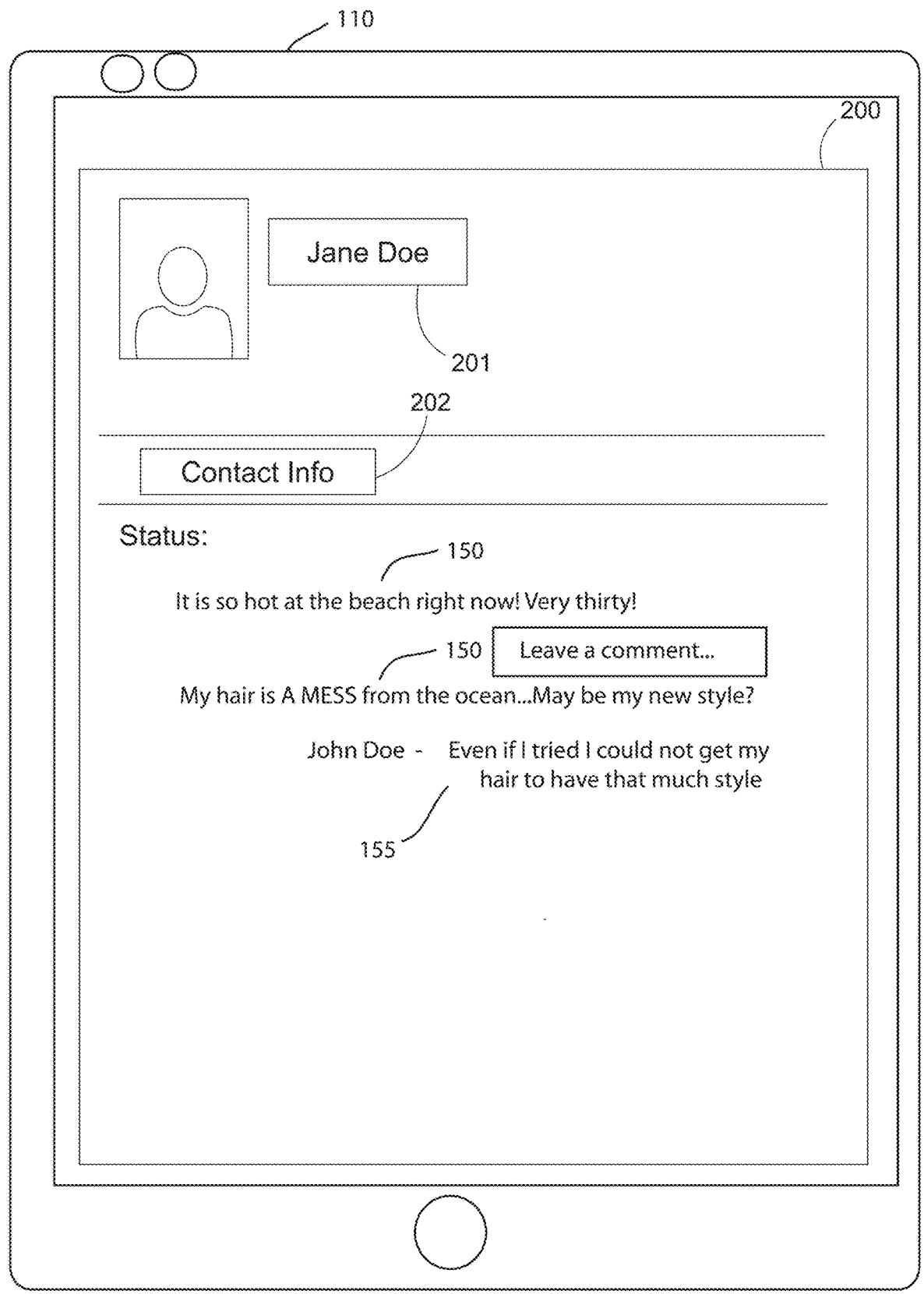
FIG. 7 depicts the graphical user interface of FIG. 6, wherein a user has interacted with the post on the social media platform, in accordance with embodiments of the present invention.

FIG. 6 depicts another embodiment of a graphical user interface of a user computing device showing a post on a social media platform, in accordance with embodiments of the present invention. Here, a person has posted onto a social media website a status update, "My hair is A MESS from the ocean . . . May be my new style?" FIG. 7 depicts the graphical user interface 200 of FIG. 6, wherein a user has interacted with the post 150 on the social media platform 111, in accordance with embodiments of the present invention. In FIG. 7, the user has interfaced with the GUI 200 of the user computing device 110 to interact with the post 150 by posting a reply. The computing system 120 determines that the type of content of the interaction 155 is text. In particular, the user has posted a comment, "Even if I tried I could not get my hair to have that much style". The computing system 120 employs a text analysis system that may parse, identify, etc. words using, for example, a natural language processing technique, to analyze the content (e.g. words) of the interaction 155. As a result of the text analysis, the computing system 120 determines that the topic of the text portion of the interaction 155 relates to a hair, hair styling, style, etc. Further, as a result of the text analysis to determine the topic of the interaction 155, one or more keywords that define or otherwise correspond to the topic of the interaction are extracted. For example, the computing system 120 may extract "hair," "style," and "styling" as plurality of keywords associated with the determined topic of the interaction 155.

Figure 8:
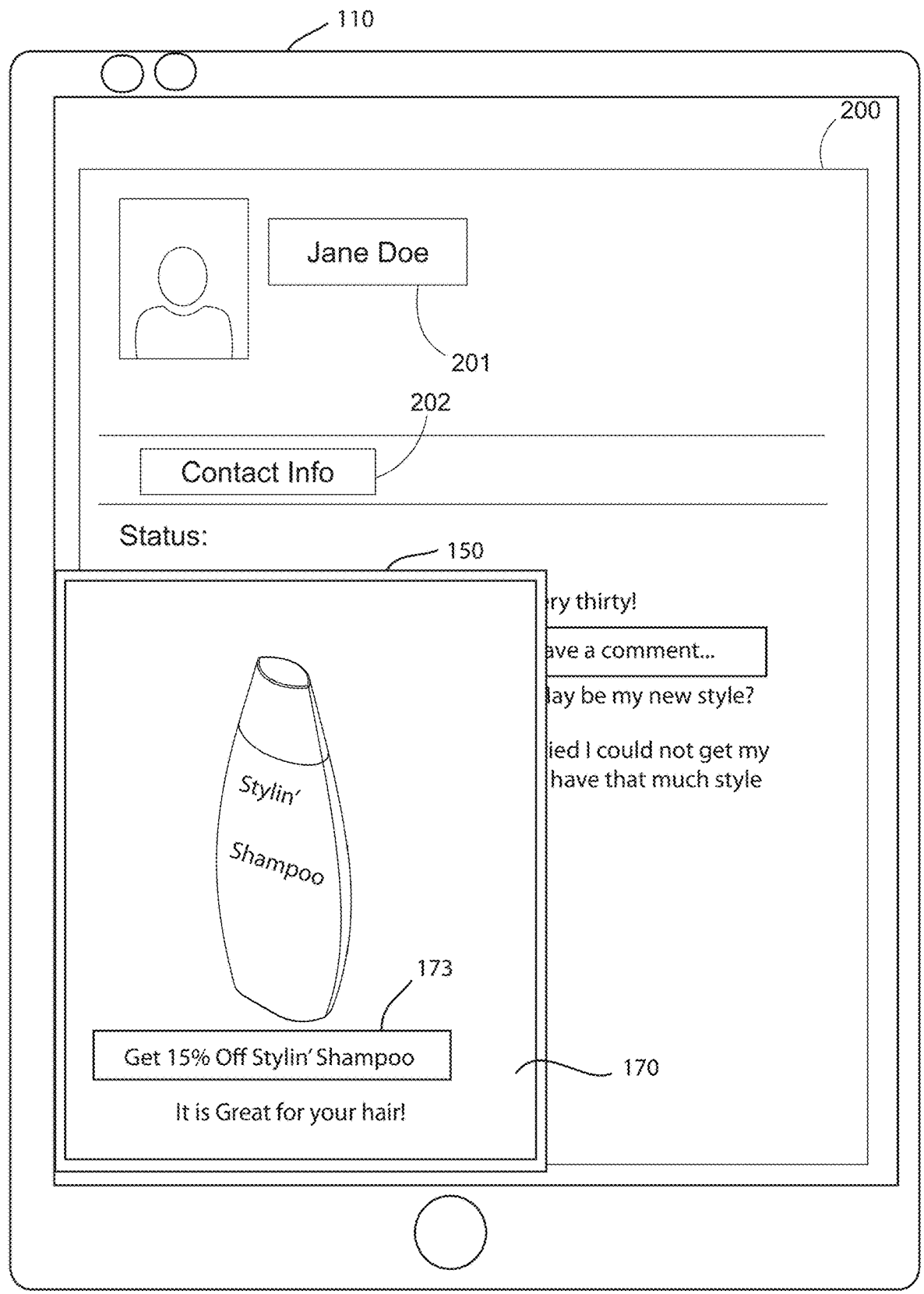
FIG. 8 depicts the graphical user interface of FIG. 7, wherein the graphical user interface has been altered by a superimposed topic-relevant digital promotion, in accordance with embodiments of the present invention.

FIG. 8 depicts the graphical user interface 200 of FIG. 7, wherein the graphical user interface 200 has been altered by a superimposed topic-relevant digital promotion 170, in accordance with embodiments of the present invention. The topic-relevant digital promotion 170 is shown superimposed on the website, thereby augmenting the GUI 200. The digital promotion 170 displayed on the website is related to the topic of "hair," "style," and "hair styling" determined by the computing system. In particular, the keywords "hair" and "style" were buried or otherwise included in the metadata of the digital promotion 170, and in response to the computing system 120 extracting that the keywords extract "hair," "style," and "styling" and mapping the keywords extract "hair," "style," and "styling" to the digital promotions database 113, the digital promotion 170 was triggered for distribution by the computing system 120. The digital promotion 170 includes a photograph of a branded shampoo bottle (e.g. Stylin' Shampoo) with a text-based offer of "Get 15% Off Stylin' Shampoo", along with a personalized message, "It is Great for your hair," which is also relevant to the context of the user's interaction 155. The GUI 200 is further augmented to include a selectable icon 173 that, when selected by the user, indicates that the user has an interest in the digital promotion. Without augmenting the GUI 200 with the digital promotion 170, the GUI 200 would remain unchanged after the interaction 155, and the user would not have the opportunity to engage the digital promotion 170. Accordingly, a topic-relevant digital promotion 170 may be superimposed onto the social media website alongside the post 150 only on the user computing device 110 so that not only is the digital promotion customized to the user's interaction 155, but also exclusively presented to the user such that the social media website is altered only on the GUI 200 of the user computing device 110.

Figure 9:
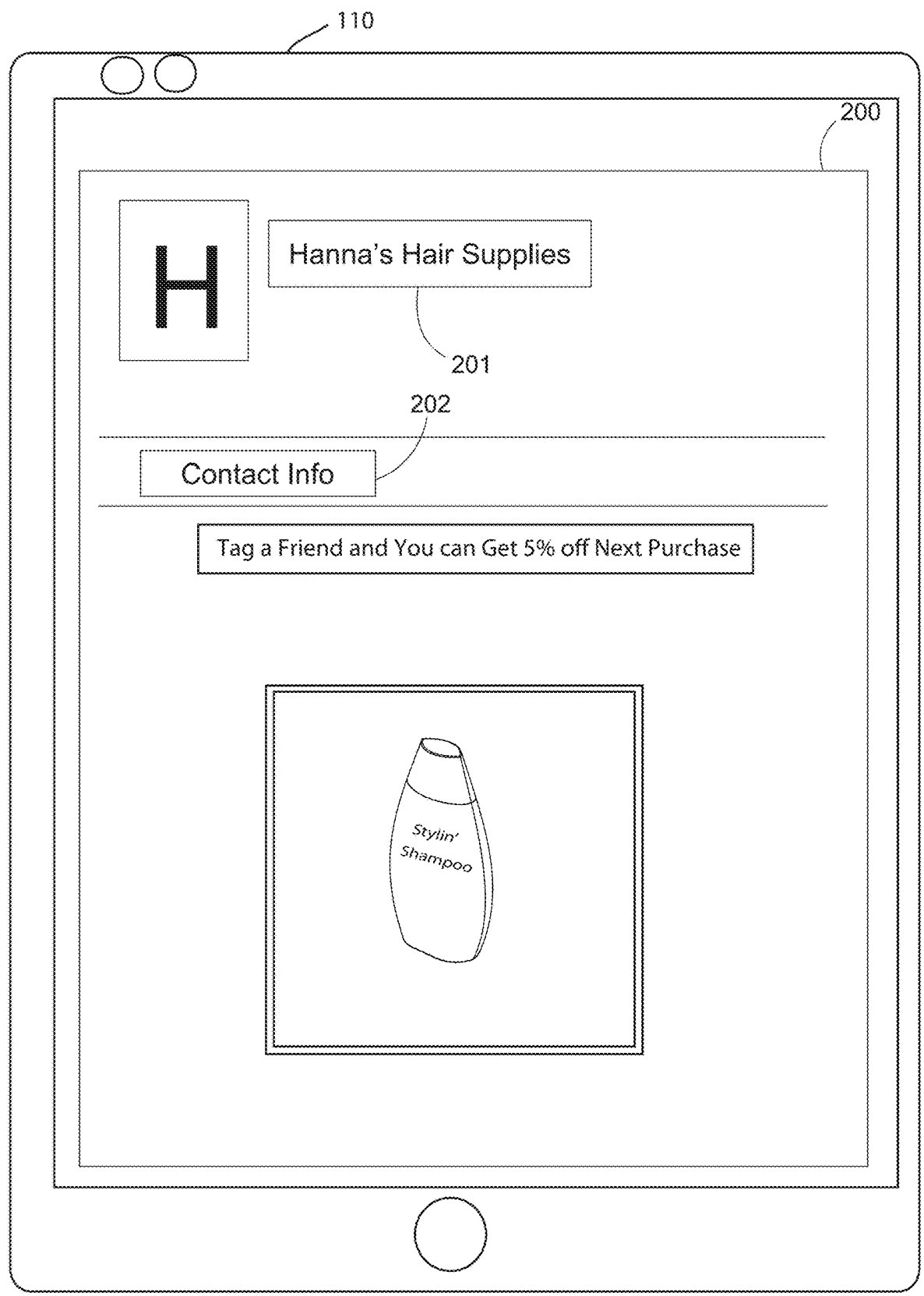
FIG. 9 depicts a social media channel of a business prompting an interaction from a user, in accordance with embodiments of the present invention.
Figure 10:
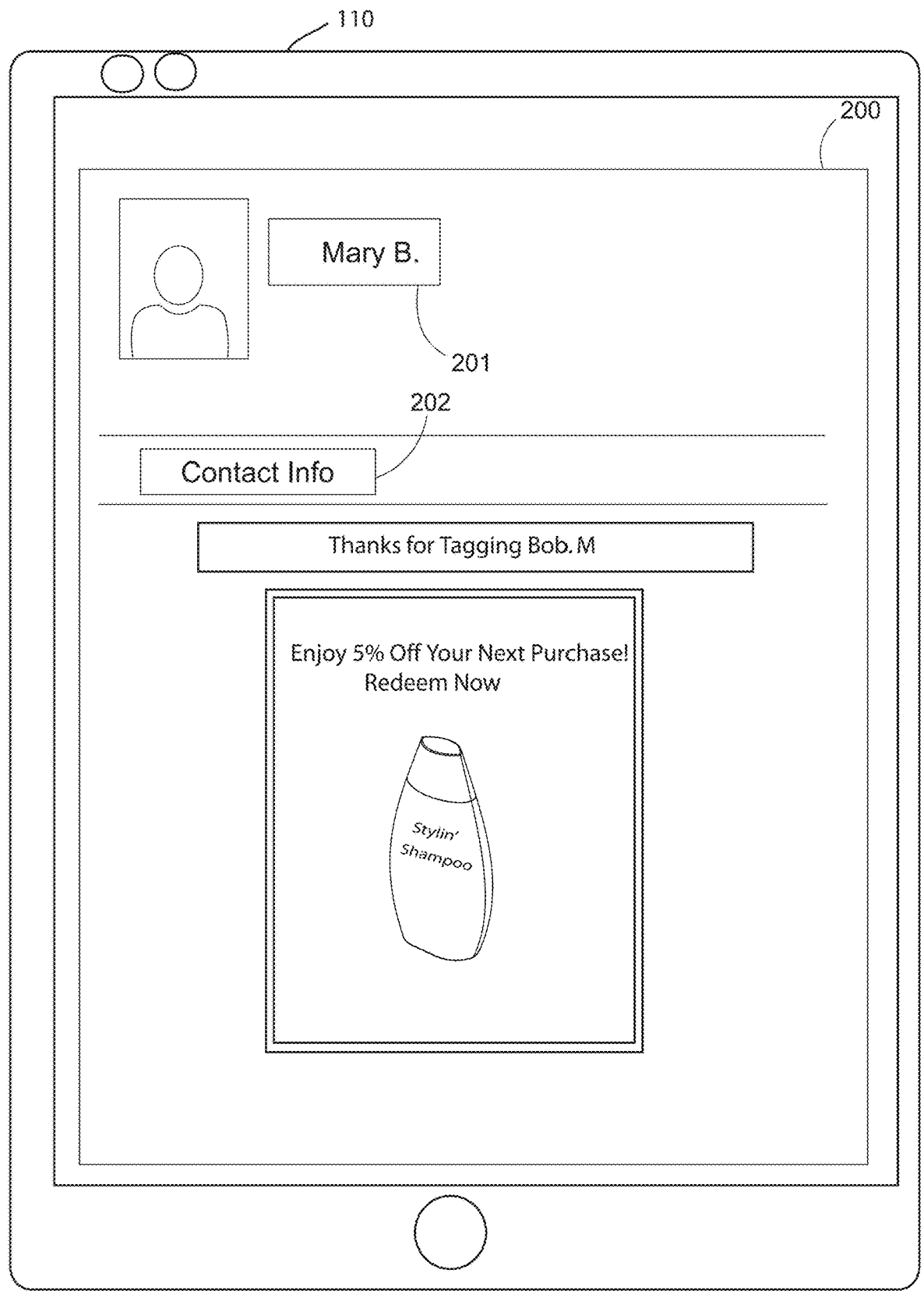
FIG. 10 depicts the graphical user interface of FIG. 9, wherein the graphical user interface 200 has been altered by a superimposed topic-relevant digital promotion, in accordance with embodiments of the present invention

In additional embodiments, the computing system 120 confirms that the user has followed a predefined set of social media actions as part of the interaction, prior to triggering the distribution of the digital promotion interacting with the social media channel requires. For example, an interaction by the user requires that the user perform additional predefined steps to unlock the distribution of the digital promotion. Thus, in addition to the topic of the interaction corresponding to one or more keywords associated with the digital promotion, the user must perform one or more predefined steps to unlock the digital promotion. FIG. 9 depicts a social media channel of a business prompting an interaction from a user, in accordance with embodiments of the present invention. The GUI 200 displays the name of the business, along with a direction to follow a social media step (i.e. tag a friend). The user, Mary B., interacts with the social media channel (i.e. Hanna's Hair Supplies) by tagging her friend Bob M. FIG. 10 depicts the graphical user interface 200 of FIG. 9, wherein the graphical user interface 200 has been altered by a superimposed topic-relevant digital promotion, in accordance with embodiments of the present invention. On Mary B's social media channel, the digital promotion is displayed as a selectable icon, which immediately lets Mary B know that she earned the reward. While only a single social media step is shown as tagging a friend, more than one social media step may be required to unlock the digital promotion. The number of social media related steps to be performed can be predefined, and can also have a tier approach. For example, each additional step that the user performs increases a percentage off the user's next purchase, which rewards a user for deeper interaction with a business on a social media channel. The social media related steps include tagging a friend, posting a link on the user's own channel, sharing the link across multiple social media platforms, retweeting the link, commenting on the social media channel, and the like. In an exemplary embodiment, the social media related action is to tag a friend that has yet to be tagged. Continuing with the example shown in FIGS. 9-10, if John K visits Hanna's Hair Supplies social media channel and wants to unlock the digital promotion, then John K cannot tag Bob M because Mary B has already tagged Bob M. if John K does tag Bob M because John K does not know that Mary B has already tagged Bob M, then the GUI of John K's user device would not be augmented to display the digital promotion. John K would then have to tag a new friend to unlock the digital promotion.

While the requirement to perform the steps can be in addition to determining that the topic is corresponds to the keywords to trigger distribution of the digital promotion, some embodiments only require that the user perform multiple social media related actions to earn/unlock the digital promotion. After completion of the social media related actions, the computing system 120 augments the user's GUI exclusively to the user to inform the user that the user has received the digital promotion.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the digital promotion system 100 change an appearance of a GUI using digital promotion selection application 130. The digital promotion system 100 may transform a GUI on a mobile device based on a user interaction with a post on a social media website. For instance, with the digital promotion system 100, a GUI may be augmented by appending topic-relevant digital promotions to the GUI such that the social media website is altered, thereby improving a GUI to connect a brand with a customer in a more personal and customized manner. The digital promotion system 100 may append text, photos, GPS coordinates, etc. to a display to change the appearance of the GUI of a social media application to preserve data usage, battery life, and processing resources of the user computing device 110 to independently search for products and/or marketing promotions for products that the user likes.

Furthermore, the digital promotion system 100 improves an efficiency of digital advertisement/promotion distribution. Without selecting the digital promotion based on a match between the topic of the interaction and associated keywords of the digital promotion, advertisement engines expend resources to distribute advertisements that may not be appealing or even relevant to the user. Embodiments of the digital promotion system 100 provides a technical solution to the above-drawbacks by altering or otherwise augmenting the GUI to include topic-relevant and personalized digital promotions to improve an efficiency of automatically distributing digital promotions. The technical solution(s) described herein is necessarily rooted in computer technology in order to overcome a problem specifically arising in the realm of GUI modification and digital advertisement placement engines, based on an interaction with a post on a social media website. For instance, instead of a user needing to perform Internet searches for deals for desired products, the GUI is automatically modified to provide such information, at an individualized level (e.g. based on a topic of the individual's interaction).

Figure 11:
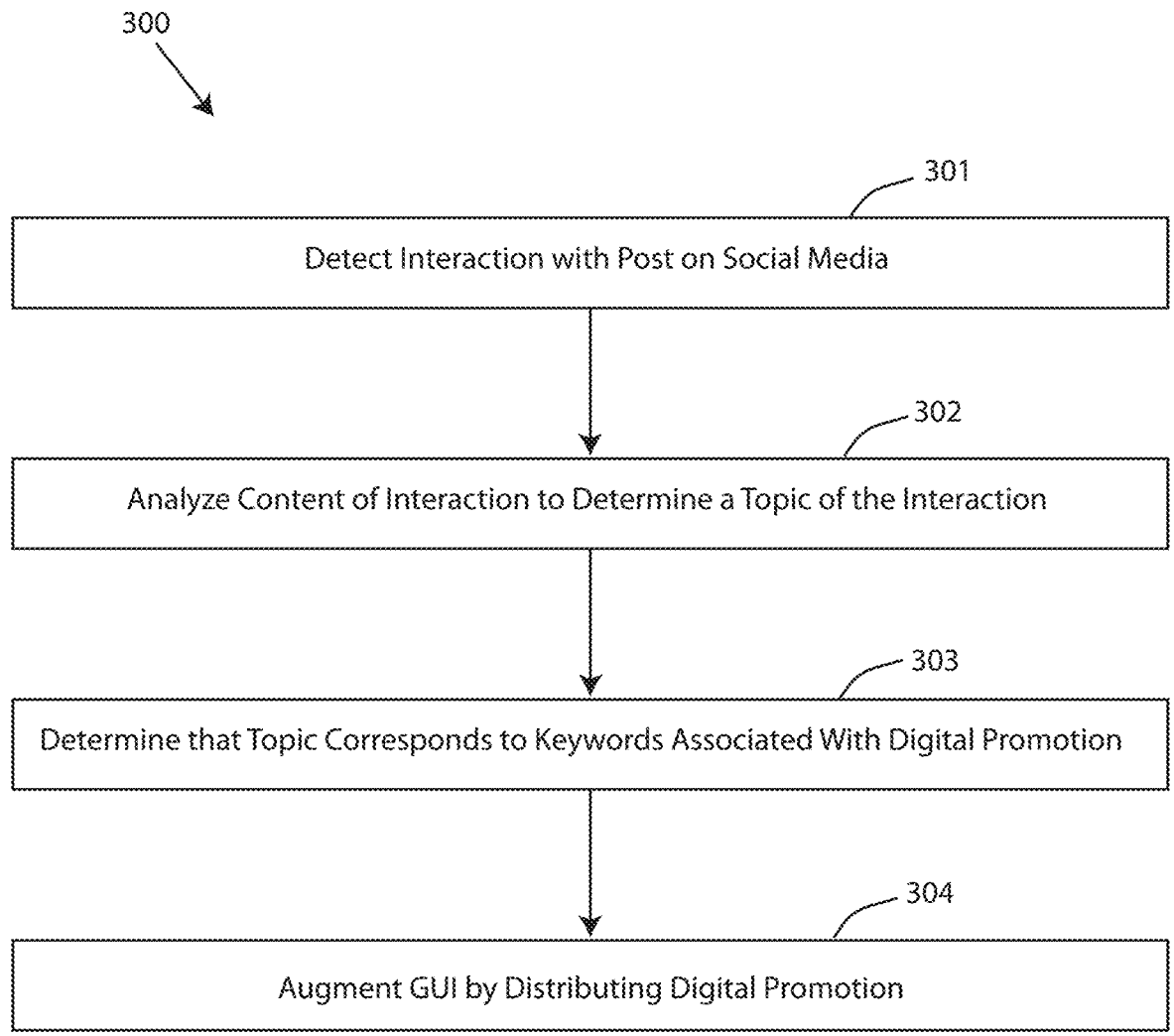
FIG. 11 depicts a flow chart of a method for selectively distributing digital promotions in response to user interactions with a graphical user interface of a user computing device, in accordance with embodiments of the present invention.

Referring now to FIG. 11, which depicts a flow chart of a method 300 for selectively distributing digital promotions in response to user interactions with a graphical user interface of a user computing device, in accordance with embodiments of the present invention. One embodiment of a method 300 or algorithm that may be implemented for selectively distributing digital promotions in response to user interactions with a graphical user interface of a user computing device with the digital promotion system 100 described in FIGS. 1-10 using one or more computer systems as defined generically in FIG. 13 below, and more specifically by the specific embodiments of FIG. 1.

Embodiments of the method 300 for selectively distributing digital promotions in response to user interactions with a graphical user interface of a user computing device, in accordance with embodiments of the present invention, may begin at step 301 wherein an interaction with a post on social media by a user is detected. Step 302 analyzes a content of the interaction to determine a topic of the interaction. Step 303 determines that the topic of the interaction corresponds to trigger keywords associated with one or more digital promotions. Step 304 augments a GUI by distributing a topic-relevant digital promotion and superimposing the digital promotion onto the GUI.

Figure 12:
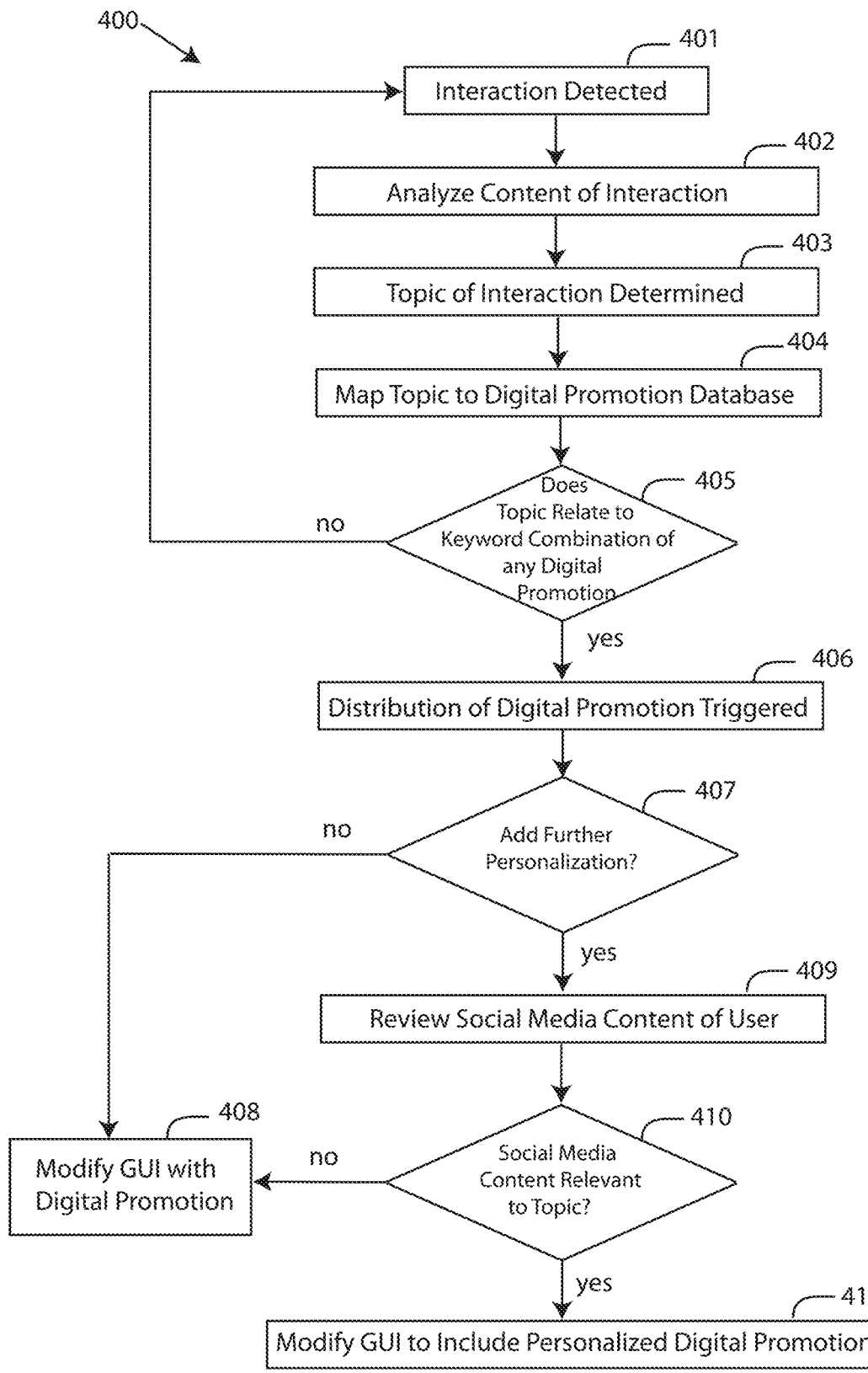
FIG. 12 depicts a detailed flow chart of a method for selectively distributing digital promotions in response to user interactions with a graphical user interface of a user computing device, in accordance with embodiments of the present invention.

FIG. 12 depicts a detailed flow chart of a method 400 for selectively distributing digital promotions in response to user interactions with a graphical user interface of a user computing device, in accordance with embodiments of the present invention. Step 401 detects an interaction with a post on a social media website. Step 402 analyzes the content of the interaction. Step 403 determines a topic of the interaction. Step 404 maps the topic to a digital promotion database. Step 405 determines whether the topic relates to a keyword combination (e.g. trigger keywords) of any digital promotion. If no, the method 400 returns to step 401. If yes, then step 406 triggers a distribution of the digital promotion. Step 407 determines whether further personalization should be added. If no, then step 408 modifies the GUI with digital promotion. If yes, then step 409 reviews social media content of the user. Step 410 determines whether the social media content is relevant to the topic of the digital promotion. If no, the method 400 moves to the step 408. If yes, step 411 modifies the GUI to include a personalized, topic-relevant digital promotion.

Figure 13:
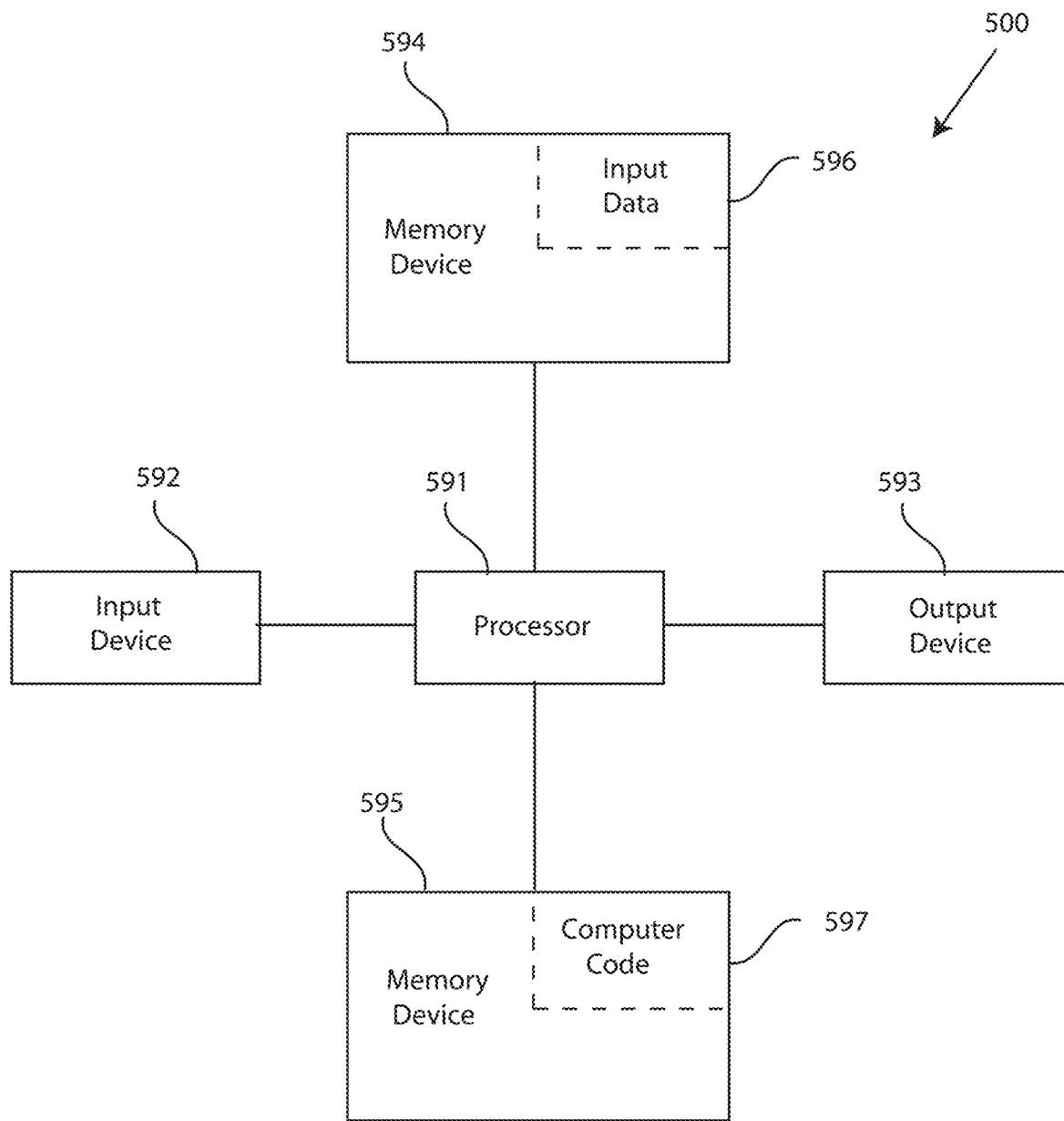
FIG. 13 depicts a block diagram of a computer system for the digital promotion system of FIGS. 1-10, capable of implementing methods for selectively distributing digital promotions in response to user interactions with a graphical user interface of a user computing device of FIGS. 11-12, in accordance with embodiments of the present invention.

FIG. 13 depicts a block diagram of a computer system for the digital promotion system 100 of FIGS. 1-10, capable of implementing for selectively distributing digital promotions in response to user interactions with a graphical user interface of a user computing device of FIGS. 11-12, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for selectively distributing digital promotions in response to user interactions with a graphical user interface of a user computing device in the manner prescribed by the embodiments of FIGS. 9-10 using the digital promotion system 100 of FIGS. 1-8, wherein the instructions of the computer code 597 may be executed by processor 591 via memory device 595. The computer code 597 may include software or program instructions that may implement one or more algorithms for implementing the method for selectively distributing digital promotions in response to user interactions with a graphical user interface of a user computing device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system, and in a third embodiment, the present invention may be a computer program product. Any of the components of the embodiments of the present invention can be deployed, managed, serviced, etc. by a service provider that offers to deploy or integrate computing infrastructure with respect to selective digital promotion and GUI modification systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to selectively distribute digital promotions in response to user interactions with a graphical user interface of a user computing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for selectively distributing digital promotions in response to user interactions with a graphical user interface of a user computing device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for selectively distributing digital promotions in response to user interactions with a graphical user interface of a user computing device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
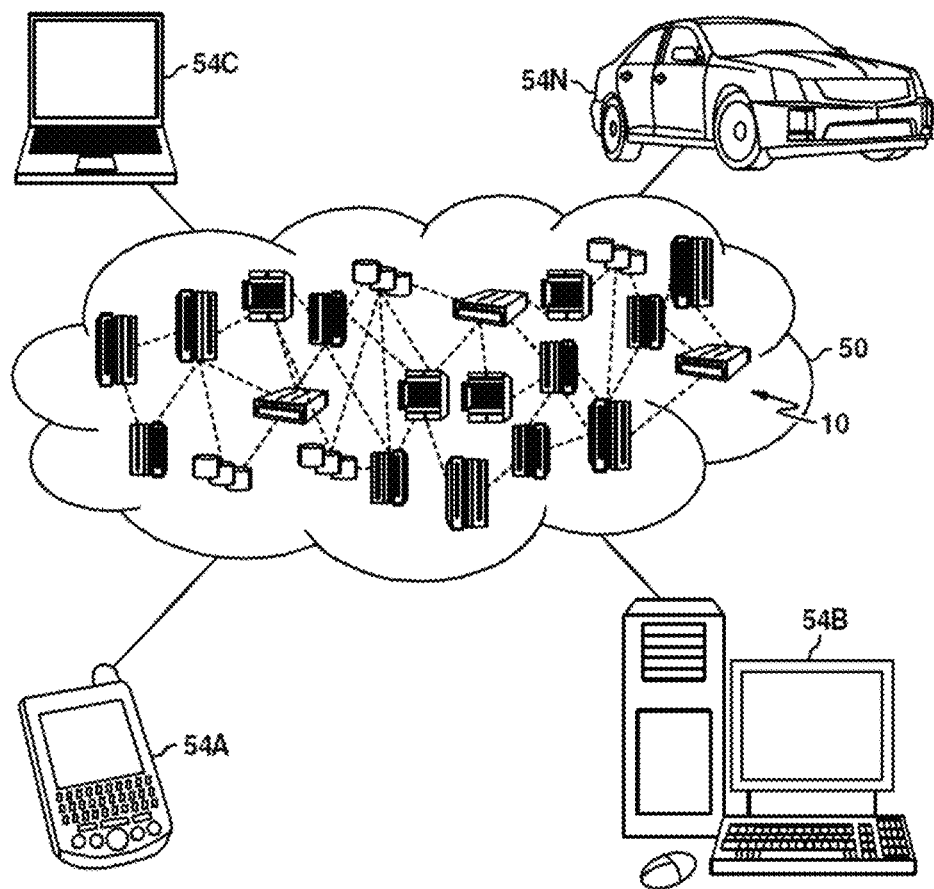
FIG. 14 depicts a cloud computing environment, in accordance with embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 14 are intended to be illustrative only and that computing nodes 10 and cloud computing environment 50 can communicate with any type of computerized device over any type of network and/or network addressable connection (e.g., using a web browser).

Figure 15:
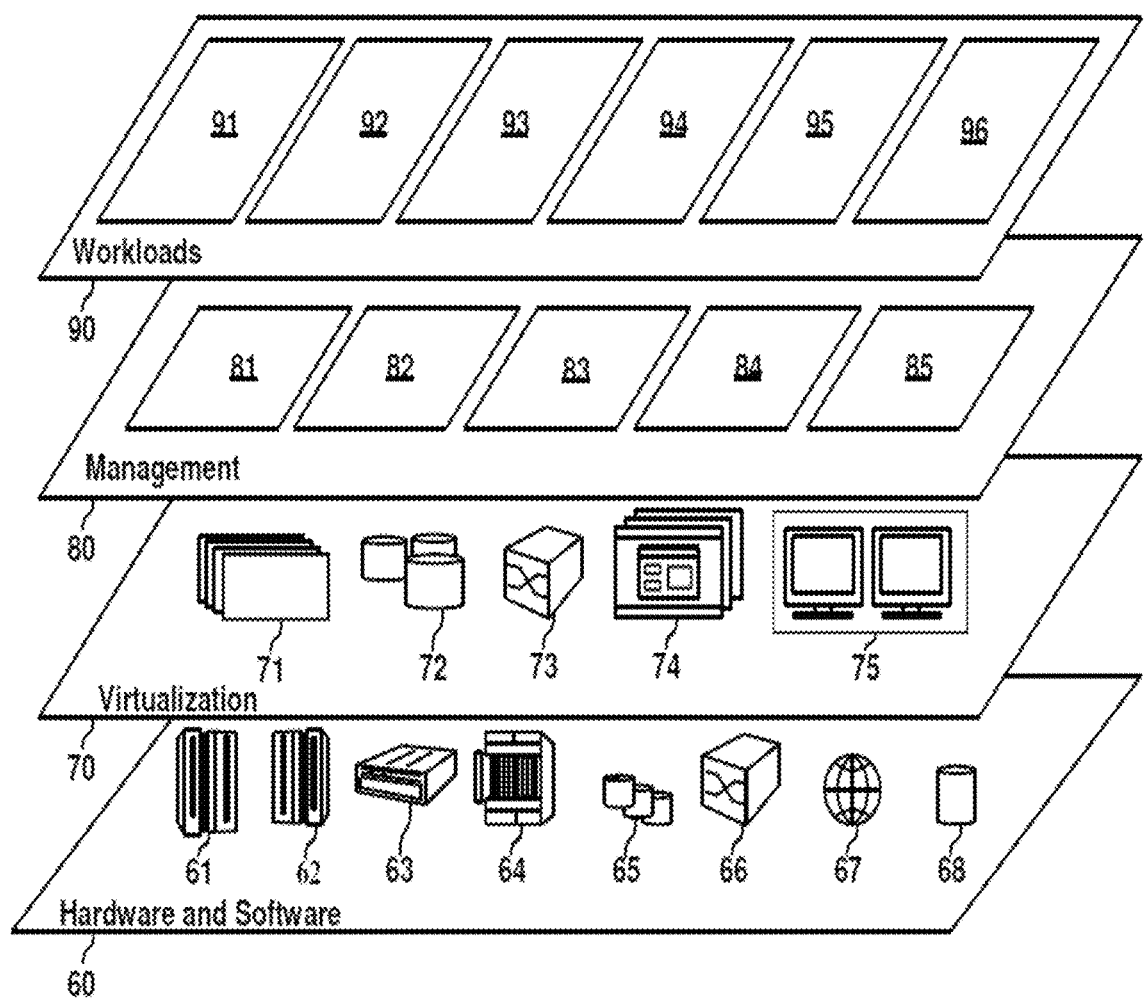
FIG. 15 depicts abstraction model layers, in accordance with embodiments of the present invention.

Referring now to FIG. 15, a set of functional abstraction layers provided by cloud computing environment 50 (see FIG. 14) are shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and selective digital promotion distribution 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying contents of a graphical user interface of a user computing device in response to an individual user interaction with the graphical user interface, the method comprising:
   detecting, by a processor of a computing system, the individual user interaction on a social media channel by a user interfacing with the graphical user interface of the user computing device, wherein a type of content of the individual user interaction is determined in response to the detecting;
   analyzing, by the processor, the type of content of the individual user interaction to determine a topic of the individual user interaction with the post on the social media channel;
   determining, by the processor, that the topic of the individual user interaction corresponds to one or more keywords associated with a digital promotion, which triggers a distribution of the digital promotion in response to the individual user, interaction with the graphical user interface;
   augmenting, by the processor, the graphical user interface of the user computing device by displaying the digital promotion to the social media channel, thereby modifying the graphical user interface of the user computing device so that the graphical user interface of the user computing device displays the digital promotion in response to the interaction alongside the individual user interaction; and
   prior to augmenting the graphical user interface to display the digital promotion, modifying, by the processor. the digital promotion initially selected to adjust for tendencies and previous engagement statistics of the user.

2. The method of claim 1, wherein the type of content includes text, a photograph, a video, an illustration, an animated media file, a location check-in, and a digital file.

3. The method of claim 1, wherein the digital promotion is further personalized to the user, based on a shared social media content across the social media channel.

4. The method of claim 1, further comprising: further augmenting, by the processor, the graphical user interface to include a selectable icon that, when selected by the user, indicates that the user has an interest in the digital promotion.

5. The method of claim 1, wherein the topic relates to at least one of: a brand of products, a type of product, a relationship between the brand and the user, a specific product, a specific store, and a service.

6. The method of claim 1, wherein the graphical user interface is augmented with the digital promotion within a predetermined amount of time measured from the interaction.

7. The method of claim I, wherein the graphical user interface is augmented with the digital promotion within a predetermined amount of time measured from an inactivity period of the user interfacing with the graphical user interface.

8. The method of claim 1, further comprising: confirming, by the processor, that the user has followed a predefined set of social media actions as part of the interaction, prior to triggering the distribution of the digital promotion.

9. A computing system, comprising:
   a processor;
   a memory device coupled to the processor; and
   a computer readable storage device coupled to the processor, wherein the storage device contains program code executable by the processor via the memory device to implement a method for modifying contents of a graphical user interface of the user computing device in response to an individual user interaction with the graphical user interface of a. user computing device, the method comprising:
- detecting, by the processor, the individual user interaction on a social media channel by a user interfacing with the graphical user interface of the user computing device, wherein a. type of content of the individual user interaction is determined in response to the detecting;
- analyzing, by the processor, the type of content of the individual user interaction to determine a topic of the individual user interaction with the post on the social media channel;
- determining, by the processor, that the topic of the individual user interaction corresponds to one or more keywords associated with a digital promotion, which triggers a distribution of the digital promotion in response to the individual user interaction with the graphical user interface;
- augmenting, by the processor, the graphical user interface of the user computing device by displaying the digital promotion to the social media channel, thereby modifying the graphical user interface of the user computing device so that the graphical user interface of the user computing device displays the digital promotion in response to the individual user interaction alongside the interaction; and
- prior to augmenting the graphical user interface to display the digital promotion, modifying, by the processor, the digital promotion initially selected to adjust for tendencies and previous engagement statistics of the user.

10. The computer system of claim 9, wherein the type of content includes text, a photograph, a video, a location check-in, and a digital file.

11. The computer system of claim 9, wherein the digital promotion is further personalized to the user, based on a shared social media content across the social media channel.

12. The computer system of claim 9, further comprising: further augmenting, by the processor, the graphical user interface to include a selectable icon that, when selected by the user, indicates that the user has an interest in the digital promotion.

13. The computer system of claim 9, wherein the topic relates to at least one of: a brand of products, a type of product, a relationship between the brand and the user, a specific product, a specific store, and a service.

14. The computer system of claim 9, wherein the graphical user interface is augmented with the digital promotion within a predetermined amount of time measured. from the interaction.

15. The computer system of claim 9, wherein the graphical user interface is augmented with the digital promotion within a predetermined amount of time measured from an inactivity period of the user interfacing with the graphical user interface.

16. The computer system of claim 9, further comprising: confirming, by the processor, that the user has followed a predefined set of social media actions as part of the interaction, prior o triggering the distribution of the digital promotion.

17. A computer program product, comprising a computer readable hardware storage device storing a computer readable program code, the computer readable program code comprising an algorithm that when executed by a computer processor of a computing system implements a method for modifying contents of a graphical user interface of a user computing device in response to an individual user interaction with the graphical user interface of the user computing device, the method comprising:
- detecting, by the processor, the individual user interaction on a social media channel by a user interfacing with the graphical user interface of the user computing device, wherein a type of content of the individual user interaction is determined in response to the detecting;
- analyzing, by the processor, the type of content of the individual user interaction to determine a topic of the individual user interaction with the post on the social media channel;
- determining, by the processor, that the topic of the individual user interaction corresponds to one or more keywords associated with a digital promotion, which triggers a distribution of the digital promotion in response to the individual user interaction with the graphical user interface;
- augmenting, by the processor, the graphical user interface of the user computing device by displaying the digital promotion to the social media channel, thereby modifying the graphical user interface of the user computing device so that the graphical user interface of the user computing device displays the digital promotion in response to the individual user interaction alongside the individual user interaction; and
- prior to augmenting the graphical user interface to display the digital promotion, modifying, by the processor, the digital promotion initially selected to adjust for tendencies and previous engagement statistics of the user.

18. The computer program product of claim 17, wherein the digital promotion is further personalized to the user, based on a shared social media content across the social media website.

19. The computer program product of claim 17, further comprising: confirming, by the processor, that the user has followed a predefined set of social media actions as part of the interaction, prior to triggering the distribution of the digital promotion.

20. The computer program product of claim 17, wherein the graphical user interface is augmented with the digital promotion within a predetermined amount of time measured from the interaction.

* * * * *